Feb. 3, 1948.　　　E. C. WEISKOPF　　　2,435,299
MICROSCOPE PROJECTING AND VIEWING APPARATUS
Filed Dec. 27, 1943　　　6 Sheets-Sheet 1

Inventor
EDWIN C. WEISKOPF
By Harry Cohn
Attorney

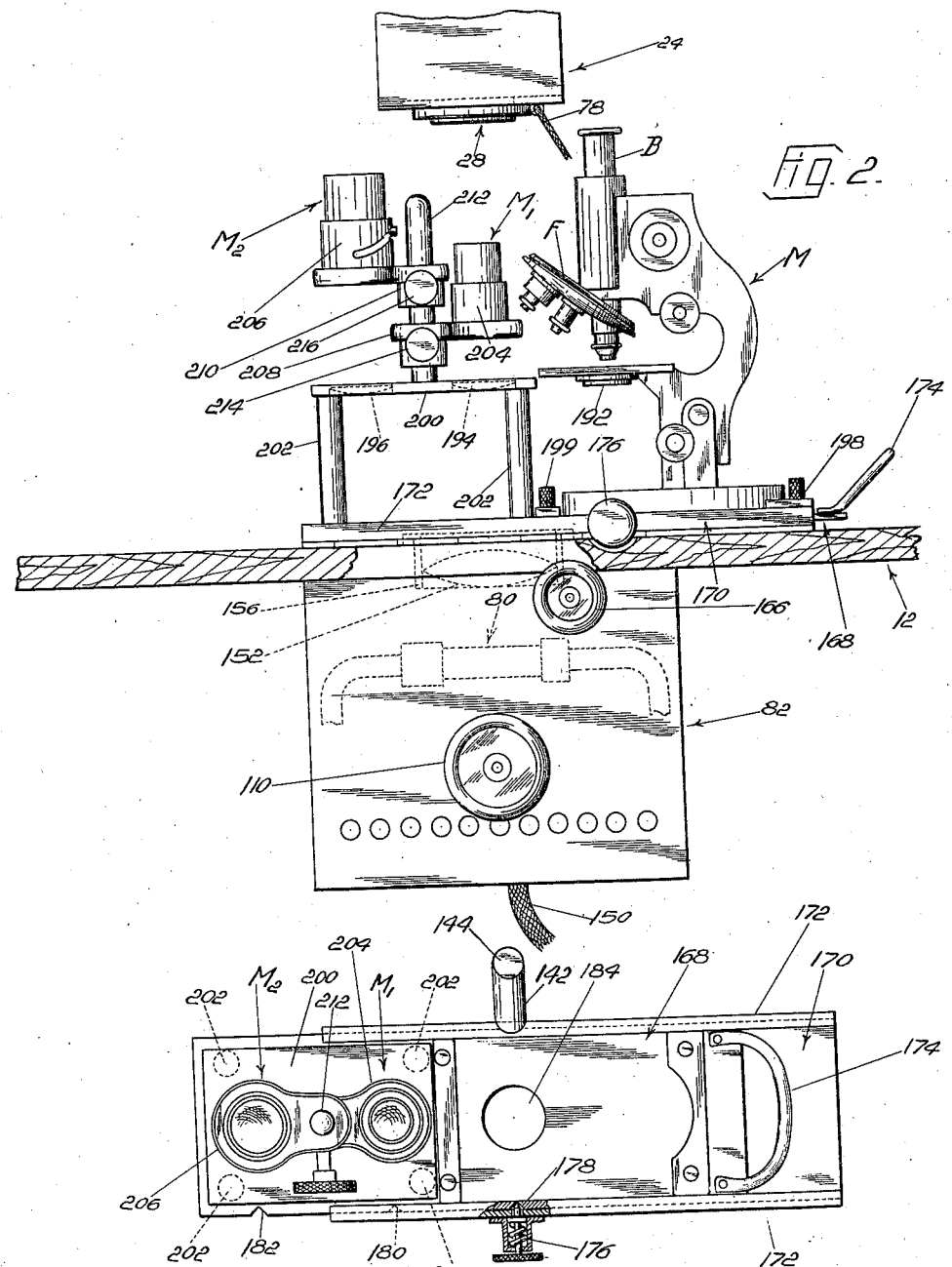

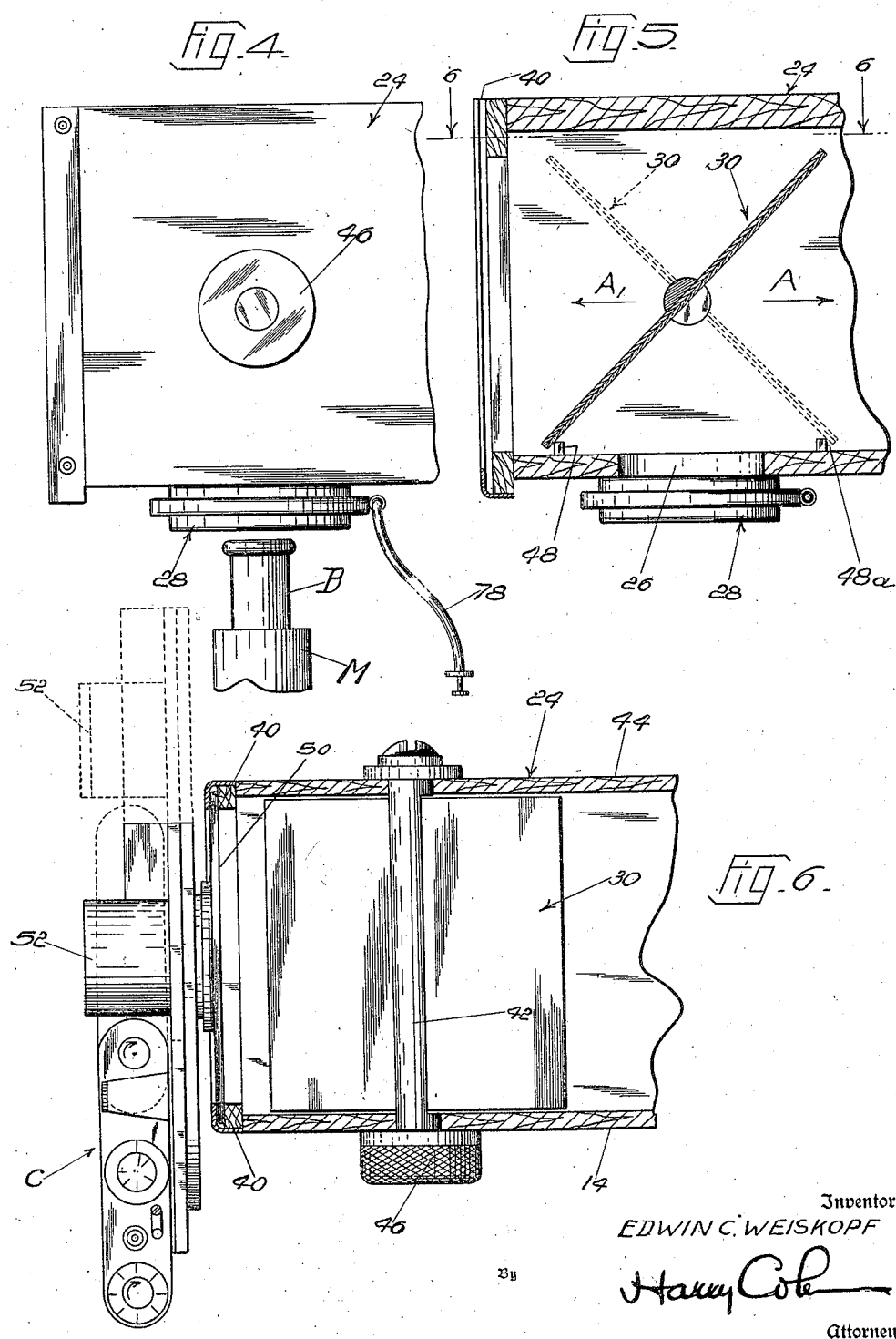

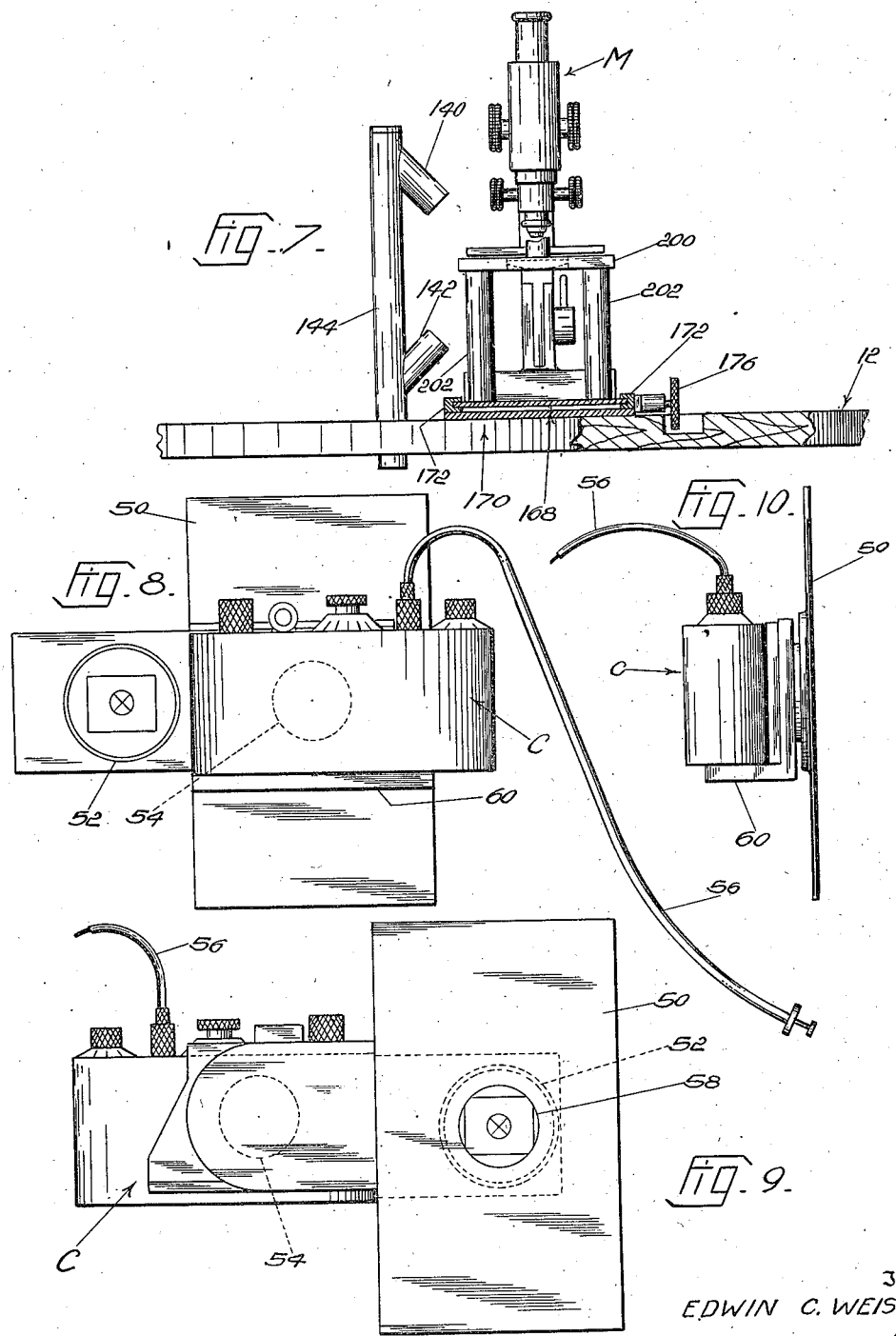

Feb. 3, 1948.　　　　　E. C. WEISKOPF　　　　　2,435,299
MICROSCOPE PROJECTING AND VIEWING APPARATUS
Filed Dec. 27, 1943　　　　6 Sheets-Sheet 5
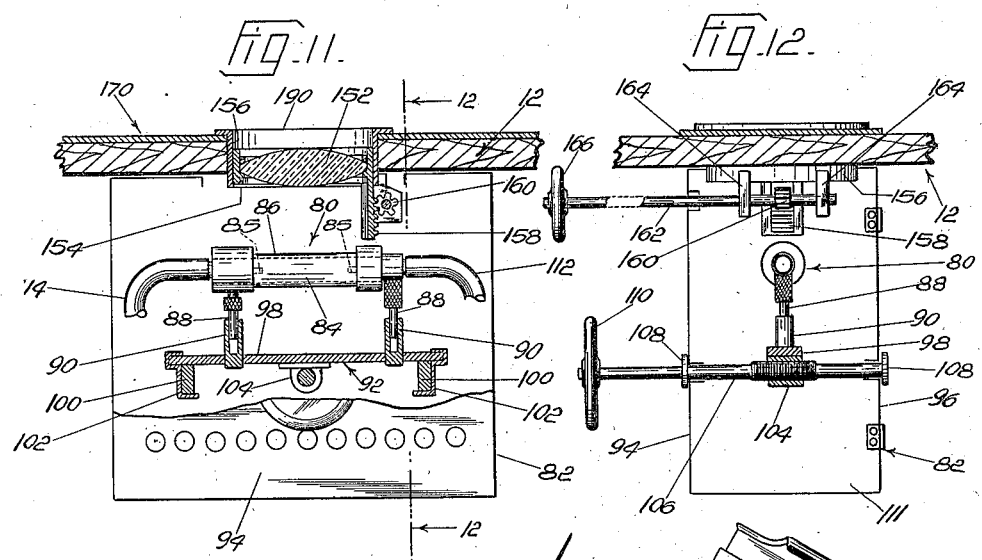
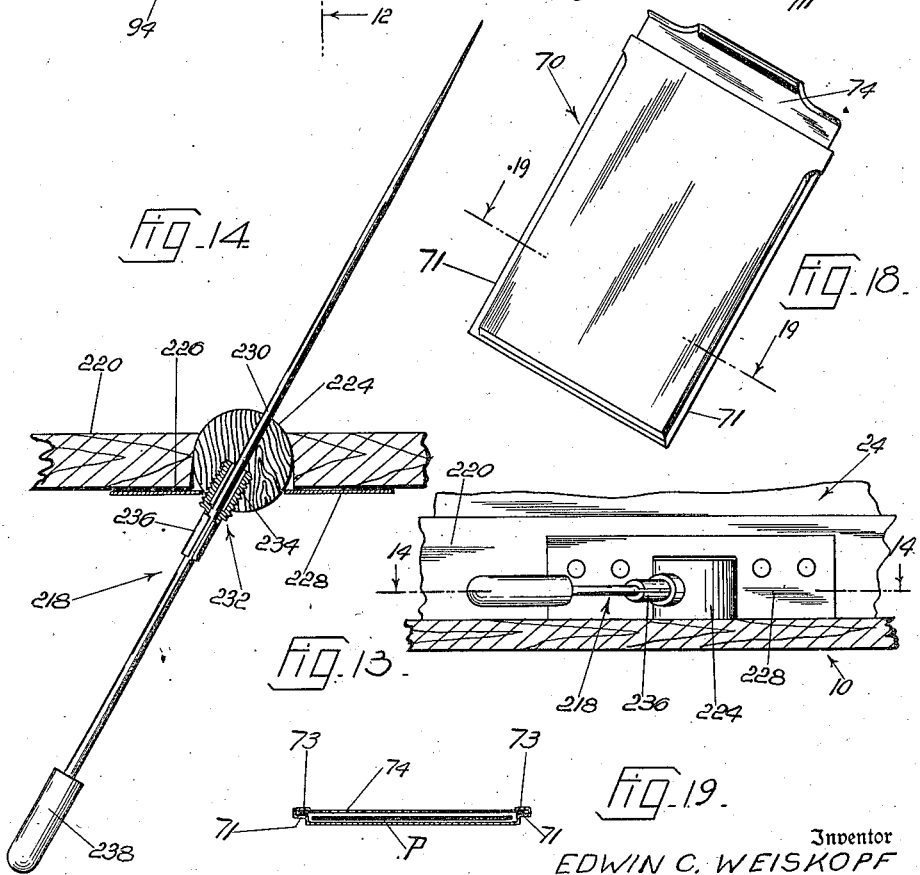
Inventor
EDWIN C. WEISKOPF
By Harry Cohn
Attorney

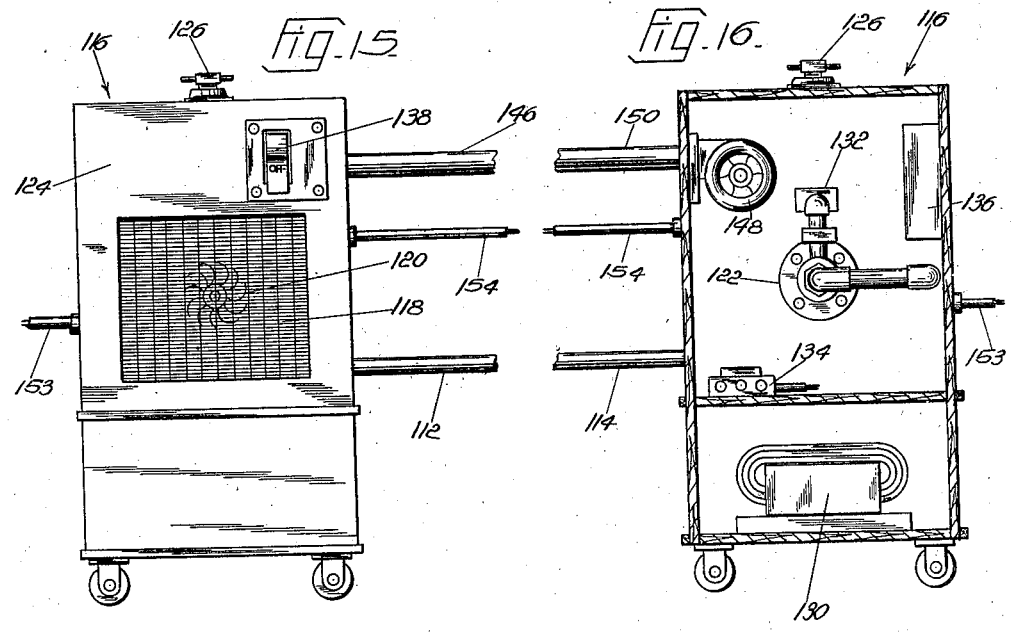
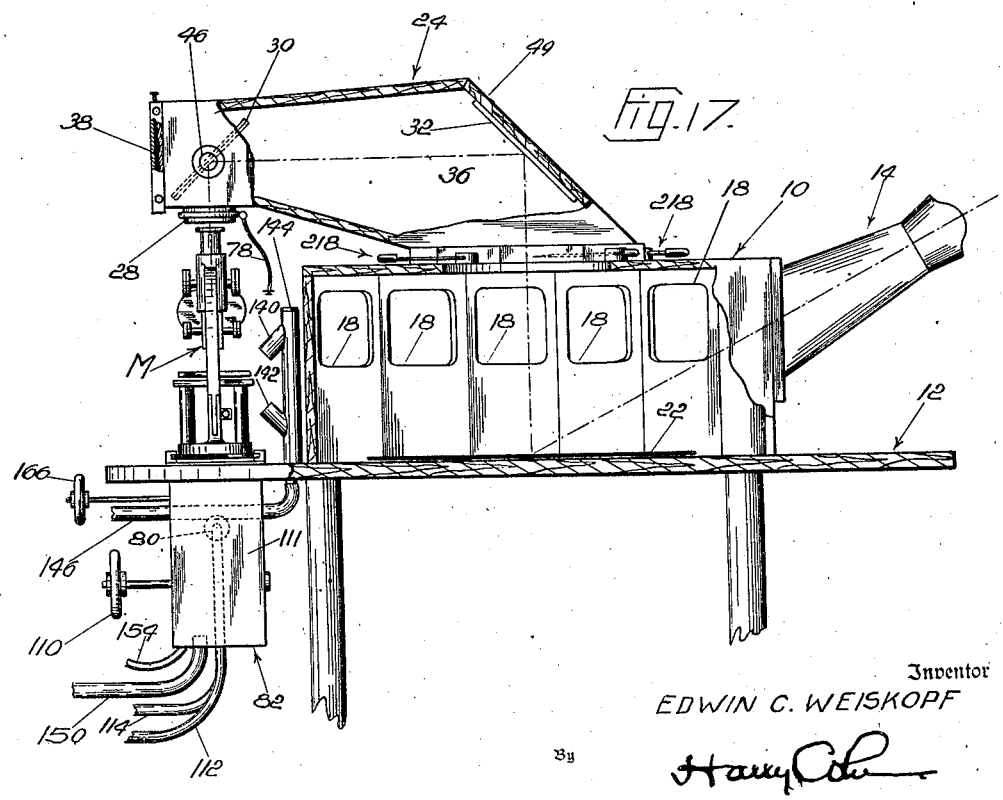

Patented Feb. 3, 1948

2,435,299

UNITED STATES PATENT OFFICE 2,435,299

MICROSCOPE PROJECTING AND VIEWING APPARATUS

Edwin C. Weiskopf, New York, N. Y.

Application December 27, 1943, Serial No. 515,736

7 Claims. (Cl. 88—24)

This invention relates to improvements in projecting and viewing apparatus of the type in which an optical image projected into a chamber which is constructed and arranged so that the image may be viewed simultaneously by a plurality of persons grouped around said chamber externally thereof in a room which may be illuminated. This application is a continuation in part of my application, Ser. No. 460,595, filed October 3, 1942, which has become Patent No. 2,378,672, dated June 19, 1945.

One object of the present invention is to provide apparatus of the type described with means for obtaining proper illumination of the image of a micro-slide or other object which is projected into said chamber for the viewing thereof, so that said image is clearly and distinctly displayed for the examination thereof in detail. In this connection, it is a further object of the invention to provide illumination fully adequate for the examination in said chamber of the image of a micro-slide under oil-immersion conditions such as those conventionally utilized when the slide is greatly magnified and viewed directly through the eye-piece of the microscope. Heretofore, attempts to obtain in a viewing chamber an adequately illuminated image of a micro-slide under oil-immersion conditions involving high amplification have not been successful.

Apparatus for projecting an image of a micro-slide or other object requires the use of a lamp of high power in the light projector in order to provide proper illumination of the projected image. The required power of the lamp is so high that the heat of the light beam concentrated on the micro-slide in the microscope or other magnifying device is sufficient to greatly impair or destroy the slide or the specimen carried thereby. It is, therefore, an object of this invention to eliminate this serious disadvantage and objection. More particularly, in accordance with the present invention and pursuant to this object thereof, provision is made in the apparatus for preventing the projected light beam from overheating the slide or impairing the specimen carried thereby or the lenses of the microscope or other magnifying device, while at the same time enabling the use of a lamp of higher candle power than was heretofore possible.

Another object is the provision of apparatus wherein the image can be projected alternatively either onto a screen in the viewing chamber or onto a screen disposed externally of said viewing chamber.

Another object is to provide apparatus wherein the image can be projected alternatively either onto a screen in the viewing chamber or onto a photographic plate or film for taking pictures of a micro-slide or other object.

A further object of the invention is the provision of apparatus with means for selectively projecting into a viewing chamber or onto a photographic plate or film differently magnified images, i. e., either images magnified by a microscope, or images enlarged by magnifying devices of less magnifying power than a microscope. In this connection, a more specific object of the invention is to provide means for mounting a microscope and one or more magnifying devices of smaller magnifying power than a microscope in relation to a source of light and a viewing chamber whereby to project alternatively either a microscopically enlarged image or an image of smaller amplification into said viewing chamber by means of the same source of light.

Another object of the invention is the provision of improved means for obtaining microphotographs or other enlarged photographs.

A further object of the invention is to construct and arrange various parts of the apparatus in such manner as to prevent vibrations of electrical or mechanical devices utilized in the apparatus from being transmitted to the microscope or other magnifier of the image or to the screen on which the image is projected, thus eliminating vibration of the image which would interfere either with the examination thereof in the viewing chamber or on a viewing screen, or with the photographing of the image.

A yet further object is generally to provide an improved projector and viewing apparatus of the viewing chamber type such as that shown in my above mentioned patent application, and also to provide such apparatus with additional devices for increasing the utility thereof.

The above and other objects, features and advantages of the present invention will be fully understood from the following description, reference being had to the accompanying illustrative drawings.

In the drawings:

Figure 2 is an end view, in elevation, of a part of the apparatus, the microscope being in position on the mounting device;

Figure 3 is a top plan view of the adjustable mounting for the microscope and the other magnifying devices, the microscope being removed for the purpose of illustration;

Figure 4 is a side view in elevation of part of the image-reflecting chamber;

Figure 5 is a view partly in elevation and partly in section of the image-reflecting chamber;

Figure 6 is a sectional view on the line 6—5 of Figure 5, and also shows a camera mounted on the chamber;

Figure 7 is an end view of part of the apparatus as seen when viewed from the left of Figure 2;

Figure 8 is a front view of a camera mount for use with the apparatus illustrated in Figure 1;

Figure 9 is a view of the back of the camera mount illustrated in Figure 8;

Figure 10 is a side view of said camera mount;

Figure 11 is a view partly in elevation and partly in section showing the lamp, the adjustable mounting for said lamp, and the adjustable condensing lens;

Figure 12 is a sectional view on the line 12—12 of Figure 11;

Figure 13 is a view on a larger scale of part of the apparatus illustrated in Figure 1;

Figure 14 is a sectional view on the line 14—14 of Figure 13;

Figure 15 is a side view in elevation of a unit forming part of the apparatus illustrated in Figure 1, said unit including a transformer for supplying high voltage current to the lamp of the light projector, an air blower, a water pump and radiator for the water for cooling the lamp in the light projector, and various auxiliary devices;

Figure 16 is a vertical sectional view of the housing of the unit illustrated in Figure 15, showing certain of the parts of the unit contained in the housing;

Figure 17 is a vertical sectional view of the image-reflecting and viewing chambers;

Figure 18 is a perspective view of a photographic-plate holder or frame which can be used as part of the apparatus; and Figure 19 is a sectional view on the line 19—19 of Figure 18.

Figure 1:
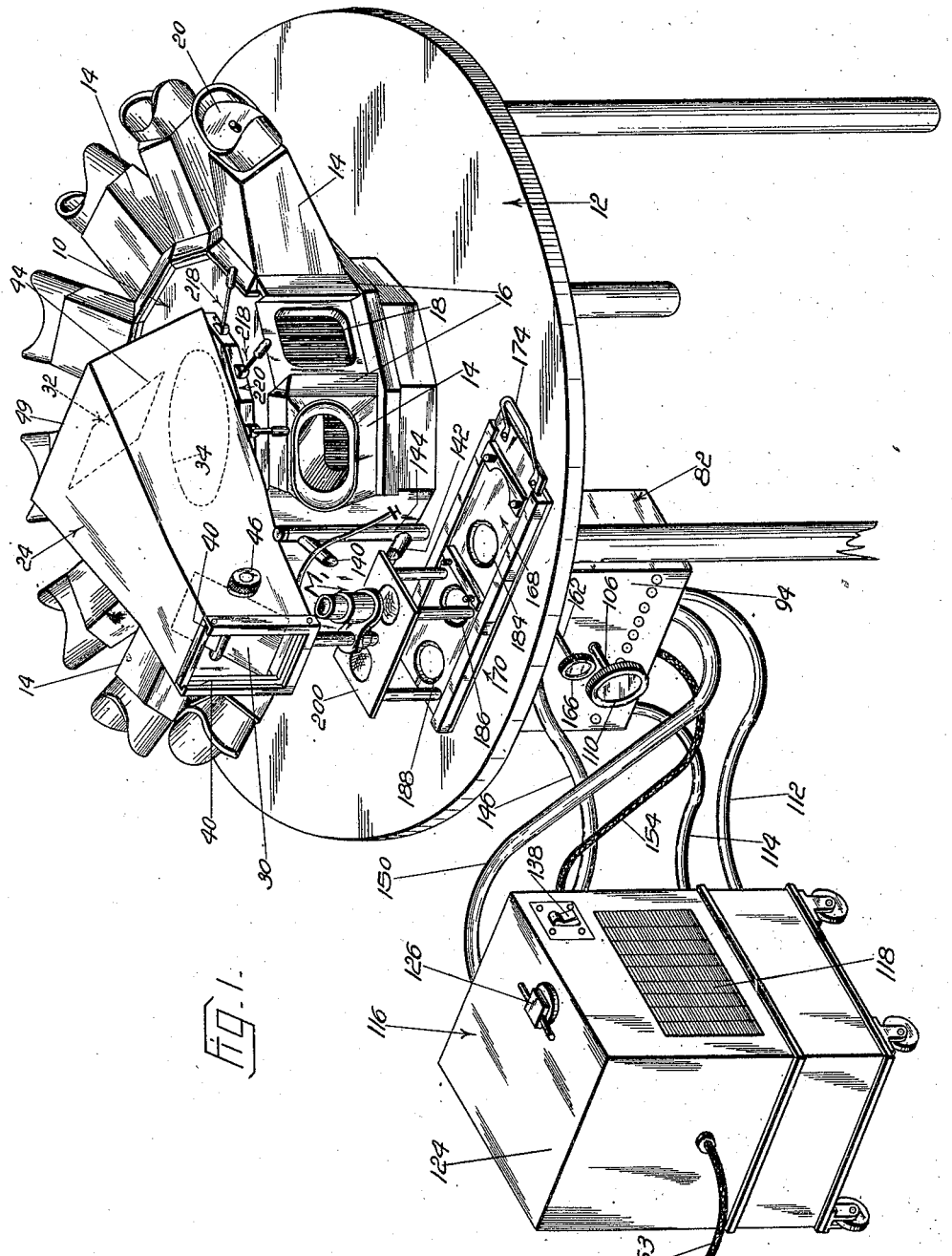
Figure 1 is a perspective view of apparatus embodying the present invention, with parts removed for the purpose of illustration.

Referring now to the drawings in detail, there is shown a viewing chamber 10 mounted on a table or other support 12 at which the observers may be seated for examining images of micro-slides or other objects projected into said chamber. Chamber 10 is provided with a plurality of upwardly inclined viewing tubes 14 mounted on the side wall of chamber 10 with their inner ends adjacent to each other and with their outer ends spaced circumferentially from each other to make room for the observers seated or standing in side by side relation around the table. Said tubes 14 are preferably removably mounted on the side wall of chamber 10 and for that purpose are slidable in companion holding and guide members 16 fixed to the side wall of said chamber. In Figure 1, one of the tubes 14 is removed from the side wall to show the companion opening 18 which registers with the inner end of the companion viewing tube. It will be understood that normally when a viewing tube is removed from the viewing chamber, the opening 18 is closed by a removable closure plate (not shown) slidably received between the companion guide members 16. Also, removable closure members 20, one of which is illustrated in Figure 1, are provided for the outer ends of the viewing tubes 14 which are not in use while one or more other viewing tubes are being used by one or more observers as the case may be. The viewing chamber 10 and the viewing tubes 14 mounted thereon are preferably constructed and arranged as more specifically described in my above mentioned application. The screen 22 (Figure 17) on which the image is projected is as here shown mounted on the top of table 12 within the viewing chamber and it will be understood that the bottom of said viewing chamber is closed by the top of said table.

An image-reflecting and light transmitting chamber 24 is mounted on the top of viewing chamber 10 and is provided near one end thereof with an opening 26 which as here shown is controlled by a camera shutter device 28 (Figures 2 and 17), with which the eye-piece of a microscope M or magnifiers M1 or M2 may, respectively, register for the projection of an enlarged image of a micro-slide or other object into chamber 24, as illustrated in Figure 2. The microscope M may be of any suitable construction and conventionally includes a plurality of lenses of different magnifying power carried by a rotary frame F to position said lenses in alignment with the lens tube B of the microscope and the eye-piece thereof. In Figure 2, the magnifier M1 is shown in position for projecting an image into the image-reflecting and light transmitting chamber 24, but as will be hereinafter more particularly described, either the microscope M or the other magnifier M2 is movable to a position in registry with the inlet opening of said chamber 24. The image projected into chamber 24 is reflected by a mirror or other reflector 30 in a direction at right angles to the axis of the microscope or other magnifier toward a mirror or other reflector 32 and by the latter is reflected downwardly into chamber 10 onto the screen 22. Chamber 24 is completely closed except for said opening 26 and a bottom opening 34 in chamber 24 which registers with an opening 36 in the top of chamber 10. In Figure 1 the end of chamber 24 is shown open for the purpose of illustration, but normally said chamber is closed by a plate 38 (Figure 17) which is slidably received in the grooves 40. It will be understood that each of the reflectors 30 and 32 is preferably positioned at an angle of 45 degrees to the vertical axis of the microscope or other magnifier.

In accordance with the present invention the reflector 30 is mounted for movement from the position illustrated in full lines in Figures 1, 5 and 17 for reflecting the image in the direction of the arrow A toward the reflector 32 as hereinbefore described, to the position shown in dotted lines in Figure 5 for reflecting the image in the direction of the arrow A1 either through the open end of chamber 24, when the plate 38 is removed, for projecting the image onto a screen disposed externally of the viewing chamber 10, or onto a photographic plate or film mounted in juxtaposition at the adjacent end of chamber 24 as will hereinafter be more particularly described. For this purpose, reflector 30 is fixed to a spindle 42 mounted for turning movement in the opposite side walls 44 (Figure 6) of chamber 24. One end of spindle 42 is provided with a knob 46 to facilitate the turning of reflector 30 to either of said positions thereof. As illustrated in Figure 5 stop members 48 and 48a are provided to engage reflector 30 at the limits of its movements to said positions, respectively, thus to predetermine the two different positions of said reflector.

As indicated above, when the reflector 30 is in the position for reflecting the image in the direction of the arrow A1, the image may be projected either onto a screen (not shown) through the open end of chamber 24, the closure plate 38 having been removed, or onto a photographic sensitized member such as photographic plate or film mounted at said open end of chamber 24 for taking a photograph of a micro-slide or other object, the image of which is projected into said chamber. For the latter purpose, a camera C may be mounted on chamber 24, as illustrated in Figure 6. For this purpose, the camera which may be of any suitable type is carried by a mounting plate 50 which is mounted in the grooves 40 of chamber 24 and closes said chamber. Said camera is provided with a view finder or ground glass screen indicated at 52, with the usual lens tube indicated at 54 and with a conventional shutter release device indicated at 56. Mounting plate 50 is provided with an opening 58 (Figure 9) and the camera C is slidably mounted on a bracket 60 for movement to register either the view finder or the lens tube of the camera with said opening 58 of mounting plate 50. The shutter device 28 which as indicated above may be any suitable camera shutter device is preferably set for time exposure when the camera C is utilized for taking a picture, and the time of exposure is controlled by setting the exposure timing device of said camera, the exposure being pursuant to the operation of the shutter, the release device 56 of the camera.

Instead of using a camera for taking a picture, the picture can be taken by means of a photographic plate P mounted in a photographic plate holder or frame 70 mounted in grooves 40 of chamber 24, said frame being provided with flanges 71 which fit in said grooves. The photographic plate holder or frame 70 includes a plate 72 having inturned edge portions 73 which form guideways for the removable photographic sensitized plate P and the removable closure plate 74. It will be understood that when the photographic plate is used for taking a picture, the exposure is controlled by the camera shutter device 28 set for instantaneous exposure and operated by a conventional shutter release device 78 (Figure 4). A viewing screen (not shown) of any suitable construction in a frame which fits in grooves 40 may be provided and it will be understood that before the photographic plate is inserted in the frame, the image to be photographed may be viewed on said viewing screen the camera shutter device 28 being in open or time-exposure set condition. Following the observation of the image on the viewing screen the latter is removed from chamber 24 and the camera shutter device 28 is adjusted for the time of exposure, after which the photographic frame 70 with the photographic plate P and the closure plate 74 therein is inserted in grooves 40 of chamber 24, after which closure plate 74 is removed and the shutter release device 78 is operated for exposing the plate for taking a picture of the image reflected by reflector 30. It will be understood that when the reflector is in the position for reflecting the image into the viewing chamber 10, the camera shutter device 28 is set to the open or time-exposure position thereof.

The viewing chamber 10 can be used for taking microphotographs or other magnified photographs of a slide or other object by placing a photographic plate or film or other sensitized member in said chamber in position to receive the image projected from the microscope or other magnifying device, such as M1 or M2, and by reflectors 30 and 32 into said chamber. This result can be accomplished since the light-entrance opening 16 of chamber 24 is provided with a camera shutter device 28, as described above. It will be understood that when a photograph is thus taken in chamber 10, the viewing tubes are closed at their outer ends by the closure members 20 so that no light can enter said chamber save the image-forming light projected into chamber 24 through said opening 16 and from said chamber by reflectors 30 and 32. Said photographic plate can be positioned within chamber 10 either on top of table 12 or above said table, and provision can be made for sliding a photographic plate holder or frame into said chamber through a normally closed opening or slot in the side thereof, said frame being provided with a removable cover plate which can be withdrawn from the chamber through said opening before the shutter device 28 is actuated for taking a picture. Said opening or slot can be closed by a suitable closure plate which can be moved or removed to permit the insertion and removal of the plate holder or frame. Also, it will be understood that when the room is dark the photographic plate or other member can be placed in position in chamber 10 through one of the openings 18 which can thereafter be closed, thus making unnecessary the use of a photographic plate holder or frame. Similarly, the photographic plate or other sensitized member can be placed in chamber 24 for taking a photograph, said sensitized member being preferably positioned horizontally in the path of the light reflected by reflector 32, and in such case the plate holder or frame, as well as a screen for focussing, can be inserted in chamber 24 and removed therefrom through an opening or slot provided for that purpose in a side wall 44 of chamber 24 near the bottom thereof located so that the plate holder will be positioned in the path of the light reflected by reflector 32. Said last mentioned opening or slot is normally closed by a movable or removable closure member. A normally closed opening can be provided in the top of chamber 24 so that the focussing screen, inserted through said opening or slot can be observed for focussing the image. Also, it will be understood that when the room is dark, the photographic plate or other sensitized member can be placed in position in chamber 24 through an opening in chamber 24, i. e. through an opening in the top or in the side wall of said chamber, thus obviating the use of a photographic plate holder or frame. Thus it seems that by reason of the provision of the camera-shutter device 28 for controlling the light-entrance opening 16 of chamber 24, the apparatus is very flexible in that it can be used in various ways, such as those described as well as in other ways which will be obvious in view of this disclosure of my invention.

It is within the scope of the present invention to project the light through the opposite end 49 of the chamber 24 by reflector 30 in the direction of arrow A onto an external screen or onto a photographic member and for this purpose said opposite end can be provided with a removable closure, and reflector 32 can be movably mounted so that it can be removed from chamber 24 or moved out of the path of the light reflected by reflector 30, for example, by pivoting the top edge of reflector 32 to the top of chamber 24 so that said reflector can be swung to a position in which it lies parallel and adjacent to said top of the chamber. Also, if desired, said end 49 of chamber 24 can be provided with grooves like the grooves 40 at the other end of the chamber to receive either a removable closure plate or a photographic plate holder 70 or the camera mounting plate 50 in the same way as hereinbefore described with reference to grooves 40 at said other end of the chamber.

As hereinbefore stated, it is important to make provision for proper illumination of the micro-slide or other object, the image of which is projected into the chamber 24 either for transmission to the viewing chamber 10 or to the external screen or to the photographic plate or film for taking a picture. For thus obtaining the required illumination, there is utilized in accordance with the present invention a high voltage mercury vapor lamp 80 (Figures 2 and 11) mounted in a housing 82. Said lamp 80 is preferably of the type disclosed in United States Letters Patent 2,094,694 and comprises a quartz capillary tube 84 containing spaced electrodes 85, pools of mercury adjacent said electrodes and discharge gas such as argon. Said tube 84 is disposed within a water jacket tube 86 by which the lamp is cooled as required by reason of the intense heat generated by the lamp during the operation thereof. The lamp is provided with terminals 88 connected to electrodes 85. Said terminals 88 fit removably in companion electric sockets 90 carried by an adjustable frame 92 and is thereby removably mounted on said frame. Frame 92 is mounted for movement in a direction extending between the opposite side walls 94 and 96 of housing 82. The lamp frame 92 comprises a plate 98 to which the sockets 90 are secured, said plate being slidably mounted on supporting and guide bars 100 which are engaged by complementary guide members 102 secured to the oposite ends of plate 98. The means for adjusting plate 92 and the lamp 80 supported thereby in the sockets 90 and movable therewith comprises a nut 104 fixed to the bottom of plate 98 and a rotary screw-threaded rod 106 which engages said nut. Rod 106 is mounted for turning movement in the opposite side walls 94 and 96 of lamp housing 82 and is held against longitudinal movement by collars 108 so that rotary movement of said rod causes movement of nut 98 longitudinally thereof for moving the frame 92 and the lamp 80 carried thereby. Said rod 106 is provided with an actuating knob 110.

The water jacket 86 of lamp 80 is connected at its ends to flexible tubes 112, 114 which are removably connected to the opposite ends of said jacket and to a water circulating and cooling system disposed in and constituting parts of a mobile unit 116. More particularly, said water circulating and cooling system comprises a radiator 118 air cooled by a motor operated fan 120, and a motor operated pump 122 in the circuit of said radiator and the jacket 86 of lamp 80. The housing 124 of mobile unit 116 is provided with a filling opening closed by a removable cap 126 for filling the radiator with water. A step up transformer 130 is disposed in and constitutes part of mobile unit 116, the high voltage side of said transformer being connected to the electric sockets 90 for energizing the lamp 80. The preferred power of lamp 80 is 1200 watts, said lamp being energized at 1,000 volts and taking a current of about 1.4 amperes. As indicated more or less diagrammatically in Figure 16, a flow-controlled switch 132 is associated with the water-circulating system and preferably with the input side of the transformer 130 for controlling the electric circuit so that in the event of the failure of the circulation of cooling liquid through the jacket 86 of said lamp, the lamp is extinguished, preferably by interrupting the primary of said transformer. Various other auxiliary devices, such as for example, a fuse box 134 and a relay 136 for controlling the electric circuit of the lamp are also disposed in the housing 124 of unit 116. The main control electric switch is indicated at 138, said switch being located at a convenient part of housing 124. Lamp housing is provided at either or both ends thereof with a hinged door 111 to provide access to lamp 80 and other parts in the interior of said housing. It will be understood that lamp 80 can be easily removed from sockets 90 for replacement or repair. If desired, provision may be made in any known way for preventing opening of said door or doors 111 when lamp 80 is energized or unless the main switch 138 is open.

Provision is made for preventing the heat of the light beam transmitted to the micro-slide by lamp 80 from impairing or destroying the slide or the specimen carried thereby. It is also desirable to cool the condensing lenses in the sub-stage condenser of the microscope or the condensing lenses of the other magnifiers. For this purpose, provision is made for cooling the micro-slide or other slide carrying the specimen or object and also provision is made for cooling the condensing lenses of the microscope or other magnifiers. As here shown, this is accomplished by directing blasts of air by means of tubes 140 and 142 against the slide in the microscope or other magnifier and against the condensing lens of the microscope or other magnifier. Tubes 140 and 142 are connected to a tube 144 supplied with air under pressure through a flexible tube 146 which is connected to a motor-operated air blower 148 mounted in and constituting a part of mobile unit 116. It will be understood that the motors for operating water pump 122 and air blower 148 may be controlled by the switch 138 so that as soon as said switch is closed for energizing lamp 80 through the transformer and the electric auxiliaries, said blower is operated for forcing air through flexible tube 146 into the supply tube 144 and from the latter to the air directing tubes 140 and 142 for cooling the slide or other object in the microscope or other magnifiers and for cooling the condensing lens of said microscope or other magnifier. If desired, the motors for operating said water pump 122 and air blower 148 may be controlled by switches independently of the switch which controls the circuit of the transformer so that said pump and air blower can be operated before lamp 80 is energized, flow-control switch 132 being operative to prevent operation of said lamp unless cooling liquid is circulated through its jacket as hereinbefore described. The air inlet of blower 148 is preferably at the outside of housing 124 so that the blower is supplied with cool air. Blower 148 is also connected by means of a flexible tube 150 to the lamp housing 82 whereby to force cooling air through said housing for cooling said housing and the parts positioned therein and also for cooling the condensing lens 152 (Figure 11) which converges the light from the lamp 80 to the lenses of the microscope or other magnifiers. The electric supply cord indicated at 153 may be connected to any suitable electric outlet for supplying operating current to the transformer 130 and to the other electrically operated devices, and a suitably insulated flexible cable 154 extends from housing 124 of the mobile unit 116 to the lamp housing 82. Thus, unit 16 is connected to housing 82 only by the flexible water and air tubes and by the flexible cable 154, so that the devices in unit 116 are maintained out of vibrating relation to the optical devices and apparatus. It is to be noted that by mounting the transformer 130 and the motor operated pump and the motor operated fan out of vibration transmitting relation to the table or support 12, the vibrations of said transformer and the movable devices mounted in housing 124 are prevented from being transmitted to lamp 80 or to the microscope or other magnifiers or to any other part of the apparatus carried by or supported on table 12.

Condensing lens 152 is preferably aspheric and is preferably adjustable for light-focusing purposes. As shown in Figures 11 and 12, said lens is carried by a ring 154 which is slidably fitted in a guide tube 156 provided in an opening in the top of table 12. Ring 154 has a rack 158 fixed thereto. A pinion gear 160 which meshes with said rack for moving the same is fixed to a rotary rod 162 mounted for turning movement in brackets 164 in housing 82. Rod 162 is provided with an operating knob 166. Thus by turning knob 166 in one direction or the other, lens 152 is moved toward or away from lamp 80 for focusing the light beam of said lamp. Ordinarily, with a proper adjustment of the lenses of the microscope or other magnifiers, the image projected into the chamber 24 can be brought into proper focus either on the screen of viewing chamber 20 or on the photographic plate or film by adjusting the lens 152.

As stated above, the microscope M and the magnifiers M1 and M2 are mounted for movement to position them selectively in registry with the opening in the image-reflecting chamber 24. For this purpose the microscope and the other magnifiers M1 and M2 are mounted on a slidable base plate 168 which is slidable on a guide plate 170 fixed to the top of table 12. Guide plate 170 is provided with grooved side walls 172 in which the opposite marginal side edges of base plate 168 have a sliding fit whereby said base plate is guided for movement longitudinally of guide plate 170 and is held against movement away from the surface of said guide plate and against movement laterally thereof. Base plate 168 is provided with a handle 174 to facilitate movement of said base plate and the magnifiers carried thereby longitudinally of guide plate 170 to position the desired magnifier in registry with the opening 26 of image-reflecting chamber 24. A spring pressed detent 176 is carried by the front side member 172 of guide plate 170 and is engageable in any one of a series of notches 178, 180 or 182 in the adjacent edge of base plate 168 for releasably holding said base plate in the selected position. Base plate 168 is provided with a plurality of openings 184, 186 and 188 (Figure 1) adapted to register with an opening 190 in the guide plate 170 formed at the end of the tube 156 in which the condensing lens 152 is adjustably mounted as hereinbefore described. It will be understood that the openings 184, 186 and 188 are in alignment with the condensing lenses 192, 194 and 196 of the microscope, magnifier M1 and magnifier M2, respectively. Microscope M is removably mounted on base plate 168 and can be removably secured thereon in any suitable way as by screw-operated clamping members 198 and 199. The condensing lenses 194 and 196 of magnifiers M1 and M2 are mounted on a stage plate 200 fixed to the upper ends of posts 202 which are fixed to and upstand from base plate 168. The lens tubes 204 and 206 of magnifiers M1 and M2, respectively, are carried by brackets 208 and 210 which are adjustably supported by a post 212 which is fixed to and upstands from the stage plate 200. Brackets 208 and 210 are provided with set screws 214, 216 for releasably securing said brackets in adjusted position longitudinally of post 212. Also, said brackets are preferably turnable around the axis of post 212 so that the positions of magnifiers M1 and M2 in relation to the condensing lenses 194 and 196 can be reversed if desired. It will be understood that by turning bracket 110 magnifier M2 can be positioned in registry with the opening in the image-reflecting chamber 24 without moving the base plate 168 when the latter is positioned with lens 194 in alignment with said opening. Also, it will be noted that the magnifiers M1 and M2 or either of them can be easily removed and replaced by magnifiers of different amplifying powers. The provision for selectively positioning the microscope M and one or more other magnifiers to register with the image-reflecting chamber 24 is highly desirable as it enables differently magnified images to be viewed in the viewing chamber 10 or to be projected on a screen externally of said viewing chamber or onto a photographic plate or film. For example, a slide or photographic transparency of a cancerous growth can be projected through the magnifier M1 or M2 followed by the projection of a micro-slide carrying a microscope section of said cancerous growth through the microscope M, thus enabling observation and examination of the microscopic section or various areas thereof in comparison with an enlargement of the cancerous growth from which said microscopic section was obtained. Further, it will be understood that by adjusting the frame F for varying the magnifying power of the microscope, various areas of the microscopic section carried by the micro-slide in the microscope can be selectively amplified as may be required for the examination of said section or for taking photographs thereof.

In the use of the apparatus it is frequently necessary or desirable to be able to indicate or call attention to a particular area of the image of the slide or other object being observed or examined in the viewing chamber. For this purpose, a plurality of pointers 218 (Figures 1, 13, 14 and 17) are provided. These pointers are mounted in spaced relation peripherally of the upper peripheral wall portion 220 of viewing chamber 10. Said pointers are carried by cylindrical members 224 which are mounted for turning movement in companion openings 226 provided in part 220 of viewing chamber 10. Each cylindrical member 224 is held in position in its opening 226 by a plate 228. Pointer 218 is also movable transversely of the axis of its companion cylindrical member 224 through an opening 230 provided in said cylindrical member. The pointer is frictionally retained in adjusted position by a member 232 (Figure 14) which comprises a sleeve 234 threaded into the cylindrical member and an integral split spring metal sleeve 236 which resiliently engages the pointer and releasably holds the latter in adjusted position. The pointer is provided with a head or finger piece 238 to facilitate manipulation of the pointer. It will be understood that the pointer is movable into and out of the path of the light beam reflected by the reflector 32 on screen 22 so that an image of a part of the stem of the pointer is reflected by the reflector 32 onto the screen 22 in the observation chamber 10 when the pointer is moved into the path of light between reflector 32 and screen 22. By moving the pointer so as to turn the companion cylindrical member 224 and by moving the pointer longitudinally of the opening 280 provided in said cylindrical member, while the pointed end portion of the pointer is in the path of the light beam transmitted from the reflector 32, an image of the pointer can be positioned at will in relation to any part of the image of micro-slide or other object on screen 22 for indicating or calling attention to any particular point or area of said micro-slide or other object. It will be understood that the pointers 218 can be withdrawn from the path of the beam of light between reflectors 30 and 32 without disengaging the pointers from their companion mounting members 224.

Suitable light filters are preferably used so that the light transmitted from lamp 80 and projected through the microscope or other magnifying device will be of the proper color characteristics. For this purpose the light filter is preferably positioned between lens 152 and the lens 192, 194 or 196 which is in alignment therewith depending upon the position of base plate 168 on guide 170. Thus, micro-slides or colored transparencies can be examined or photographed in color without substantial color modification thereof by the light from lamp 80.

The provision in this apparatus, in accordance with my invention, of mercury-vapor lamp 80 as the source of light for the microscope is highly advantageous because the image of a microslide projected either onto a screen in the viewing chamber or onto a screen externally of said chamber in a darkened room is of such character in respect to its illumination by said lamp as to enable the proper examination of the details of a section of tissue in the microscopic examination of histological specimens without requiring the slide to be viewed by the observer through the eye-piece of the microscope. More particularly, the present invention, in accordance with which lamp 80 is provided, has made possible for the first time, so far as I am aware, the projection of microslides on a screen in a darkened room in such manner that the slide can be examined simultaneously by a group of people, with the use of a single microscope and without sacrifice of detail in the examination. Also, pursuant to this invention, the lamp 80 enables the viewing chamber 10 to be utilized with better results than was heretofore attainable in using such chamber in microscopic examinations of slides of histological specimens. Further, as the color of the light emitted by lamp 80 is in the region of the green and blue of the spectrum and as the cell structure of histological sections are ordinarily colored with a blue stain, the light from said lamp accentuates the blue color of the stained cell structure of the specimen and thereby improves the visibility thereof. Preferably, however, in utilizing said lamp a color filter is employed, as described above, in order to provide adequate illumination of the muscle and connective tissue of the specimen. It will be understood that microscopically enlarged images can be projected on a screen in a darkened room, in accordance with the present invention involving the use of lamp 80 without the use of chamber 24 of the viewing chamber apparatus, although said apparatus is preferred as it enables convenient micro-projection optionally either into the viewing chamber or onto a screen in a room, since one or the other is obtained merely by mounting reflector 30 in the selected positions, respectively, thereof for reflecting light either in the direction of arrow A or in the direction of arrow A1, closure plate 38 being removed in the latter case.

It will be understood that various changes may be made in the construction and arrangement of the various parts of the apparatus within the scope of the invention and that certain parts and features of the invention may be used without others without departing from the invention as defined by the appended claims.

Having thus described my invention, what I claim as new and desire to secure by Letters Patent, is:

1. In apparatus which comprises a viewing chamber provided with a plurality of viewing openings, and means for transmitting a beam of light from a magnifying instrument into said chamber, said means including means forming a passage for said light and reflecting means for reflecting the light from said passage into said chamber through an opening between said passage and said chamber, said passage being provided with a light-entrance opening for the beam of light from said magnifying device, means for projecting light through the magnifying device comprising a high-power mercury-vapor tubular lamp, and means for mounting said tubular lamp in horizontal position transversely of the optical axis of the magnifying device and in vertical alignment with the optical axis of the lens system of said magnifying device.

2. In apparatus which comprises a viewing chamber provided with a plurality of viewing openings, and means for transmitting a beam of light from a magnifying instrument into said chamber, said means including means forming a passage for said light and reflecting means for reflecting the light from said passage into said chamber through an opening between said passage and said chamber, said passage being provided with a light-entrance opening for the beam of light from said magnifying device, means for projecting light through the magnifying device comprising a high-power mercury-vapor tubular lamp, and means for mounting said tubular lamp in horizontal position in vertical alignment with the optical axis of the lens system of said magnifying device, said mounting means comprising a member mounted for horizontal movement transversely of the optical axis of the magnifying device, and means operatively connected to said member for moving the same whereby to position said lamp so that the light therefrom registers with the condensing lens of the magnifying device.

3. In apparatus which comprises a viewing chamber provided with a plurality of viewing openings, and means for transmitting a beam of light from a magnifying instrument into said chamber, said means including means forming a passage for said light and reflecting means for reflecting the light from said passage into said chamber through an opening between said passage and said chamber, said passage being provided with a light-entrance opening for the beam of light from said magnifying device, means for projecting light through the magnifying device comprising a high-power mercury-vapor tubular lamp, and means for mounting said tubular lamp in horizontal position in vertical alignment with the optical axis of the lens system of said magnifying device transversely of the optical axis of the magnifying device, a condensing lens positioned between said lamp and the magnifying device to transmit a beam of light to the magnifying device, means mounting said lens for vertical movement toward and away from said lamp, and means operatively connected to said condensing lens for moving the same vertically toward and away from said lamp in the direction of the optical axis of the magnifying device.

4. In micro-projection apparatus which comprises a microscope through which a beam of light is projected for projecting the magnified image of a micro-slide, means for projecting intense light through said slide and the lens system of the microscope in which said slide is mounted comprising a high power mercury-vapor tubular lamp, and means for mounting said tubular lamp in horizontal position in light-transmitting relation to the slide and the lens system of the microscope in which said slide is mounted, said mounting means comprising a member mounted for horizontal movement transversely of the optical axis of the magnifying device, and means operatively connected to said member for moving the same whereby to position said lamp so that the light therefrom passes through said slide and through the lens system of said microscope, said lamp being positioned for vertical alignment with the optical axis of the lens system of the microscope.

5. In micro-projection apparatus which comprises a microscope through which a beam of light is projected for projecting the magnified image of micro-slide, means for projecting intense light through said slide and the lens system of the microscope in which said slide is mounted comprising a high power mercury-vapor tubular lamp, and means for mounting said tubular lamp in horizontal position in light-transmitting relation to the slide and the lens system of the microscope in which said slide is mounted, said lamp being positioned for vertical alignment with the optical axis of the lens system of the microscope, said mounting means comprising a member mounted for horizontal movement transversly of the optical axis of the microscope, and means operatively connected to said member for moving the same whereby to position said lamp so that the light therefrom passes vertically through said slide and through the lens system of said microscope, a condensing lens positioned in the path of the light from said lamp to the microscope, means mounting said condensing lens for movement in said path toward and away from said lamp, and means operatively connected to said condensing lens for moving the same toward and away from said lamp.

6. Apparatus for use with a microscope for projecting images of micro-slides through the lens system of the microscope, comprising supporting means for the microscope, a lamp housing having a light outlet for the passage of light to the microscope, a high voltage water-cooled lamp mounted in said housing, means for supporting said housing in juxtaposition to said microscope supporting means, and a power unit provided with a transformer and with a pump supported therein and operatively connected to said lamp for energizing the latter and for circulating cooling water therethrough, said power unit having its own support separate from the microscope and lamp-housing supporting means, and the connections between said pump and transformer and said lamp being flexible whereby to prevent the transmission of vibrations of said pump and said transformer to said lamp-housing and microscope supporting means.

7. Apparatus for use with a microscope for projecting images of micro-slides through the lens system of the microscope, comprising supporting means for the microscope, a lamp housing having a light outlet for the passage of light to the microscope, a high voltage water-cooled lamp mounted in said housing, means for supporting said housing in juxtaposition to said microscope supporting means and a power unit provided with a transformer and with a pump supported therein and operatively connected to said lamp for energizing the latter and for circulating cooling water therethrough, said power unit having its own support separate from the microscope and lamp-housing supporting means, and the connections between said pump and transformer and said lamp being flexible whereby to prevent the transmission of vibrations of said pump and said transformer to said lamp-housing and microscope supporting means, said power unit being movable as a unit to various positions near said lamp housing whereby the apparatus including said power unit can be transferred in toto from one room to another.

EDWIN C. WEISKOPF.

REFERENCES CITED

The following references are of record in the file of this patent:

UNITED STATES PATENTS

| Number | Name | Date |
|---|---|---|
| 1,433,877 | Exton | Oct. 31, 1922 |
| 1,530,441 | Thomson | Mar. 17, 1925 |
| 1,548,675 | Gayhart | Aug. 4, 1925 |
| 1,704,811 | Stuber | Mar. 12, 1929 |
| 1,786,543 | Marshall | Dec. 30, 1930 |
| 1,894,004 | Rose | Jan. 10, 1933 |
| 2,029,871 | Johnson | Feb. 4, 1936 |
| 2,042,244 | Winninghoff | May 26, 1936 |
| 2,064,368 | Bausch et al. | Dec. 15, 1936 |
| 2,094,694 | Bol et al. | Oct. 5, 1937 |
| 2,133,321 | Ehrlich | Oct. 18, 1938 |
| 2,160,648 | De Jong et al. | May 30, 1939 |
| 2,195,425 | Roger | Apr. 2, 1940 |
| 2,248,210 | Worthington et al. | July 8, 1941 |
| 2,313,639 | Hauser | Mar. 9, 1943 |